(12) United States Patent
Kim

(10) Patent No.: US 8,988,904 B2
(45) Date of Patent: Mar. 24, 2015

(54) POWER SUPPLY WITH INTEGRATOR FOR CONTROLLING CURRENT

(75) Inventor: Bonkee Kim, Gyeonggi-do (KR)

(73) Assignee: Hideep Inc. (KR)

( * ) Notice: Subject to any disclaimer, the term of this patent is extended or adjusted under 35 U.S.C. 154(b) by 267 days.

(21) Appl. No.: 13/421,994

(22) Filed: Mar. 16, 2012

(65) Prior Publication Data

US 2012/0268971 A1 Oct. 25, 2012

(30) Foreign Application Priority Data

Mar. 16, 2011 (KR) .......................... 10-2011-0023287
Jun. 6, 2011 (KR) .......................... 10-2011-0054313

(51) Int. Cl.
*H02M 3/335* (2006.01)
*H02M 1/42* (2007.01)
*H02M 1/00* (2006.01)

(52) U.S. Cl.
CPC ........ *H02M 3/33523* (2013.01); *H02M 1/4258* (2013.01); *H02M 2001/0009* (2013.01); *Y02B 70/126* (2013.01)
USPC .................... 363/21.16; 363/21.17; 363/21.18

(58) Field of Classification Search
USPC ............ 363/21.08, 21.09, 21.1, 21.16, 21.17, 363/21.18
See application file for complete search history.

(56) References Cited

U.S. PATENT DOCUMENTS

| | | | | |
|---|---|---|---|---|
| 6,304,464 | B1 * | 10/2001 | Jacobs et al. | 363/21.12 |
| 2003/0128018 | A1 * | 7/2003 | Telefus et al. | 323/284 |
| 2006/0034102 | A1 | 2/2006 | Yang et al. | |
| 2006/0077697 | A1 * | 4/2006 | Yang | 363/21.13 |
| 2008/0232142 | A1 * | 9/2008 | Yang | 363/21.16 |
| 2008/0239766 | A1 * | 10/2008 | Trattler | 363/21.05 |
| 2010/0320934 | A1 * | 12/2010 | Liu et al. | 315/294 |

FOREIGN PATENT DOCUMENTS

| | | |
|---|---|---|
| JP | 03230755 | 10/1991 |
| JP | 200823699 | 10/2008 |
| JP | 2009512404 | 3/2009 |
| JP | 2009512406 | 3/2009 |
| JP | 2010521954 | 6/2010 |

OTHER PUBLICATIONS

Zhou et al., "Novel Sampling Algorithm for DSP Controlled 2 kW PFC Converter," IEEE Transactions on Power Electronics, vol. 16, No. 2, Mar. 2001, pp. 217-222.

* cited by examiner

*Primary Examiner* — Adolf Berhane
*Assistant Examiner* — Gary Nash
(74) *Attorney, Agent, or Firm* — The Belles Group, P.C.

(57) ABSTRACT

The present invention relates to a power supply for controlling current that uses a flyback converter for electrical insulation between a load line unit and the power supply for controlling current. In a transformer (a flyback converter) having a flyback structure in the present invention, disclosed is a device which expects a current of the second coil by sensing a current of the first coil of the transformer, and controls the current flowing through the load line unit. A level detector is included, which updates a duty time or an on-time of the switch by transferring a reset signal to an integrator and a second sampler in accordance with a cycle of an input power. As a result, it is possible to reduce power loss by increasing a power factor through the adjustment of the phase of the current of the load line unit and an input voltage.

19 Claims, 10 Drawing Sheets

POWER SUPPLY WITH INTEGRATOR FOR CONTROLLING CURRENT

CROSS-REFERENCE TO RELATED APPLICATIONS

This application claims priority under 35 U.S.C. §119 to Korean Patent Application No. 10-2011-0023287 filed on Mar. 16, 2011, and to Korean Patent Application No. 10-2011-0054313 filed on Jun. 6, 2011, the entireties of which are hereby incorporated by reference.

FIELD OF THE INVENTION

The present invention relates to a power supply, and more particularly to a drive device which includes a transformer (a flyback converter) having a flyback structure and controls the current of a load line unit by controlling the output current of a switching power converter.

BACKGROUND OF THE INVENTION

With the reason of receiving power from an alternating current (AC) power source, electrical loads such as commonly used electrical and electronic devices require electrical insulation for an output connected to the load. For this reason, a first side of a driving circuit, which is connected to the AC power source, is insulated from a second side of the driving circuit, which is connected to the load, by using a transformer of a power supply for controlling current. Then, the power supply for controlling current performs feedback control by transferring information on a current flowing through the load connected to the second side to the first side. In the past, it was not possible to directly feedback electrical signals due to the electrical insulation through the transformer. Therefore, an opto-coupler and a separate comparator have been used.

The prior power supply for controlling current shown in FIG. 1 rectifies an input AC voltage into a direct current (DC) voltage, and then transfers the rectified input DC voltage of the first side to the second side by using a flyback converter. The current flowing through a load line unit is converted into a voltage which is determined by a sense resistor, and then an output voltage of the comparator is obtained by integrating the voltage through a comparison of the voltage with a reference voltage of the comparator. The output voltage is reduced with the increase of the current flowing through the load line unit. As a result, a current flowing through the opto-coupler increases in proportion to the current flowing through the load line unit, so that a feedback voltage is increased. When the feedback voltage is increased, a switching controller reduces a time during which a current flows through the first coil. Contrarily, when the current flowing through the load line unit is reduced, the time during which the current flows through the first coil is increased, so that the current flowing through the load line unit is controlled to have a magnitude corresponding to that of the reference voltage.

The prior power supply for controlling current uses the opto-coupler and the additional comparator, so that it has a cost disadvantage. Particularly, in substitution for an incandescent lamp, it has a spatial limitation.

SUMMARY OF THE INVENTION

One embodiment is a power supply for controlling current includes: a transformer which converts a first current into a second current and supplies the second current to a load line unit; a sampler which samples a peak value of the first current; an integrator which uses a signal proportional to the peak value of the first current and outputs a signal proportional to an average value of a current flowing through the load line unit; and a switching controller which controls a time during which the first current flows by means of the output signal of the integrator.

In the power supply for controlling current, with respect to a time during which energy stored in a first side of the transformer is completely transferred to a second side of the transformer, the integrator integrates the signal proportional to the peak value of the first current.

In the power supply for controlling current, with respect to a time during which energy stored in the first side of the transformer is completely transferred to the second side of the transformer, the integrator calculates the energy transfer time by sensing a voltage applied to both ends of a first coil, and integrates the signal proportional to the peak value of the first current for the energy transfer time.

In the power supply for controlling current, with respect to a time during which energy stored in the first side of the transformer is completely transferred to the second side of the transformer, the integrator obtains a voltage having the same waveform as that of a voltage applied to the first coil by adding an auxiliary coil to the transformer, calculates the energy transfer time by detecting a voltage variation of the auxiliary coil, and integrates the signal proportional to the peak value of the first current for the energy transfer time.

In the power supply for controlling current, with respect to a time during which energy stored in the first side of the transformer is completely transferred to the second side of the transformer, the integrator calculates the energy transfer time by detecting a voltage variation of a connection portion between the first coil and a switch, and integrates the signal proportional to the peak value of the first current for the energy transfer time.

In the power supply for controlling current, with respect to a time during which energy stored in the first side of the transformer is completely transferred to the second side of the transformer, the integrator integrates the signal proportional to the peak value of the first current from a time when the voltage of the connection portion of the switch becomes higher than the voltage applied to the first side to a time when both the voltages become equal to each other.

The power supply for controlling current further includes a switch switching the first current on/off. The sampler samples the first current during the on-state of the switch and holds the first current of the moment when the switch becomes in an off-state as the peak value of the first current. The switching controller controls a turn-on time of the switch through the output signal of the integrator.

The power supply for controlling current further includes a level detector transferring a reset signal to the integrator.

In the power supply for controlling current, with respect to a time during which energy stored in the first side of the transformer is completely transferred to the second side of the transformer, the integrator integrates a difference between the signal proportional to the peak value of the first current and a first predetermined reference value $V_{ref1}$, and integrates a negative value of the first predetermined reference value $V_{ref1}$ while the energy is not transferred by the transformer.

In the power supply for controlling current, the integrator has a second predetermined reference value $V_{ref2}$ as a reference value. The power supply for controlling current further includes: a first comparator which compares a value received from the integrator with a third predetermined reference value $V_{ref2}+\Delta V$; a second comparator which compares a value received from the integrator with a fourth predetermined reference value $V_{ref2}-\Delta V$; and a compensator which compensates and changes the values transferred from the two comparators into a signal corresponding to an on-time of the switch, and transfers the compensated values to the switching controller.

The power supply for controlling current further includes a second sampler which samples and holds the output signal of the integrator, and transfers the signal to the switching controller.

In the power supply for controlling current, with respect to a time during which energy stored in the first side of the transformer is completely transferred to the second side of the transformer, the integrator integrates a difference between the signal proportional to the peak value of the first current and a first predetermined reference value $V_{ref1}$, and integrates a negative value of the first predetermined reference value $V_{ref1}$ while the energy is not transferred by the transformer.

In the power supply for controlling current, the integrator has a second predetermined reference value $V_{ref2}$ as a reference value. The power supply for controlling current further includes: a comparator which compares a value received from the second sampler with the second reference value $V_{ref2}$; and a compensator which compensates and changes the value transferred from the comparator into a signal corresponding to an on-time of the switch, and transfers the compensated value to the switching controller.

In the power supply for controlling current, the load line unit includes at least one light emitting device.

Another embodiment is a power supply for controlling current includes: a transformer which converts a first current into a second current and supplies the second current to a load line unit; a first sampler which samples a peak value of the first current; an integrator which uses a signal proportional to the peak value of the first current and outputs a signal proportional to an average value of a current flowing through the load line unit; a second sampler which samples the output signal of the integrator, a level detector which transfers a reset signal to the integrator and the second sampler; and a switching controller which controls a time during which the first current flows by means of the output signal of the second sampler.

In the power supply for controlling current, the level detector updates an integration cycle of the integrator and a sampling cycle of the second sampler in accordance with a cycle of an input voltage.

In the power supply for controlling current, the level detector updates a switch-on time every half cycle of an input power.

In the power supply for controlling current, with respect to a time during which energy stored in a first side of the transformer is completely transferred to a second side of the transformer, the integrator integrates the signal proportional to the peak value of the first current.

In the power supply for controlling current, the integrator calculates the energy transfer time by sensing a voltage applied to both ends of a first coil, and integrates the signal proportional to the peak value of the first current for the energy transfer time.

In the power supply for controlling current, the integrator obtains a voltage having the same waveform as that of a voltage applied to the first coil by adding an auxiliary coil to the transformer, calculates the energy transfer time by detecting a voltage variation of the first coil, and integrates the signal proportional to the peak value of the first current for the energy transfer time.

In the power supply for controlling current, the integrator calculates the energy transfer time by detecting a voltage variation of a connection portion between the first coil and a switch, and integrates the signal proportional to the peak value of the first current for the energy transfer time.

In the power supply for controlling current, the integrator integrates the signal proportional to the peak value of the first current from a time when the voltage of the connection portion between the first side and the switch becomes higher than the voltage applied to the first side to a time when both the voltages become equal to each other.

The power supply for controlling current further includes a switch switching the first current on/off. The first sampler samples the first current during the on-state of the switch and holds the first current of the moment when the switch becomes in an off-state as the peak value of the first current. The level detector transfers the reset signal to the integrator in accordance with a cycle of an input voltage. The second sampler samples the output signal of the integrator while the reset signal of the level detector is in a low-state, and holds the output signal of the integrator while the reset signal of the level detector is in a high-state, and then transfers the output signal of the integrator to the switching controller. The switching controller controls a turn-on time of the switch through the output signal of the integrator from the second sampler.

In the power supply for controlling current, with respect to a time during which energy stored in the first side of the transformer is completely transferred to the second side of the transformer, the integrator integrates a difference between the signal proportional to the peak value of the first current and a first predetermined reference value $V_{ref1}$, and integrates a negative value of the first predetermined reference value $V_{ref1}$ while the energy is not transferred by the transformer.

In the power supply for controlling current, the integrator has a second predetermined reference value $V_{rer2}$ as a reference value. The power supply for controlling current further includes: a comparator which compares a value received from the second sampler with the second reference value $V_{ref2}$; and a compensator which compensates and changes the value transferred from the comparator into a signal corresponding to an on-time of the switch, and transfers the compensated value to the switching controller.

In the power supply for controlling current, with respect to a time during which energy stored in the first side of the transformer is completely transferred to the second side of the transformer, the integrator integrates a difference between the signal proportional to the peak value of the first current and a first predetermined reference value $V_{ref1}$, and integrates a negative value of the first predetermined reference value $V_{ref1}$ while the energy is not transferred by the transformer.

In the power supply for controlling current, the integrator has a second predetermined reference value $V_{ref2}$ as a reference value. The power supply for controlling current further includes: a first comparator which compares a value received from the second sampler with a third predetermined reference value $V_{ref2}+\Delta V$; a second comparator which compares a value received from the second sampler with a fourth predetermined reference value $V_{ref2}-\Delta V$; and a compensator which compensates and changes the values transferred from the two comparators into a signal corresponding to an on-time of the switch, and transfers the compensated values to the switching controller.

In the power supply for controlling current, the load line unit includes at least one light emitting device.

DETAILED DESCRIPTION

An embodiment of the present invention will be described in detail with reference to the accompanying drawings. In the components of the present invention, detailed descriptions of what can be clearly understood and easily carried into practice through a prior art by those skilled in the art will be omitted to avoid making the subject matter of the present invention unclear. Furthermore, a power supply for controlling current in accordance with the embodiment of the present invention is intended to deal with all kinds of loads that can be controlled by a current control method. Hereafter, a case where a load line unit is implemented as a light emitting device will be taken as an example for convenience of description.

Figure 1:
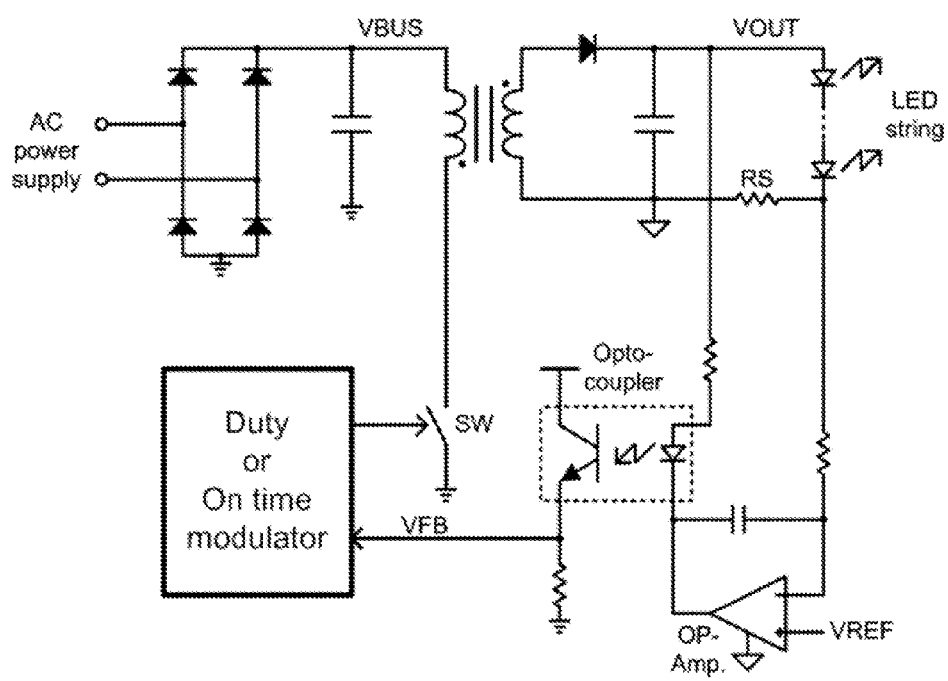
FIG. 1 is a view showing a circuit for a prior power supply for controlling current.
Figure 2:
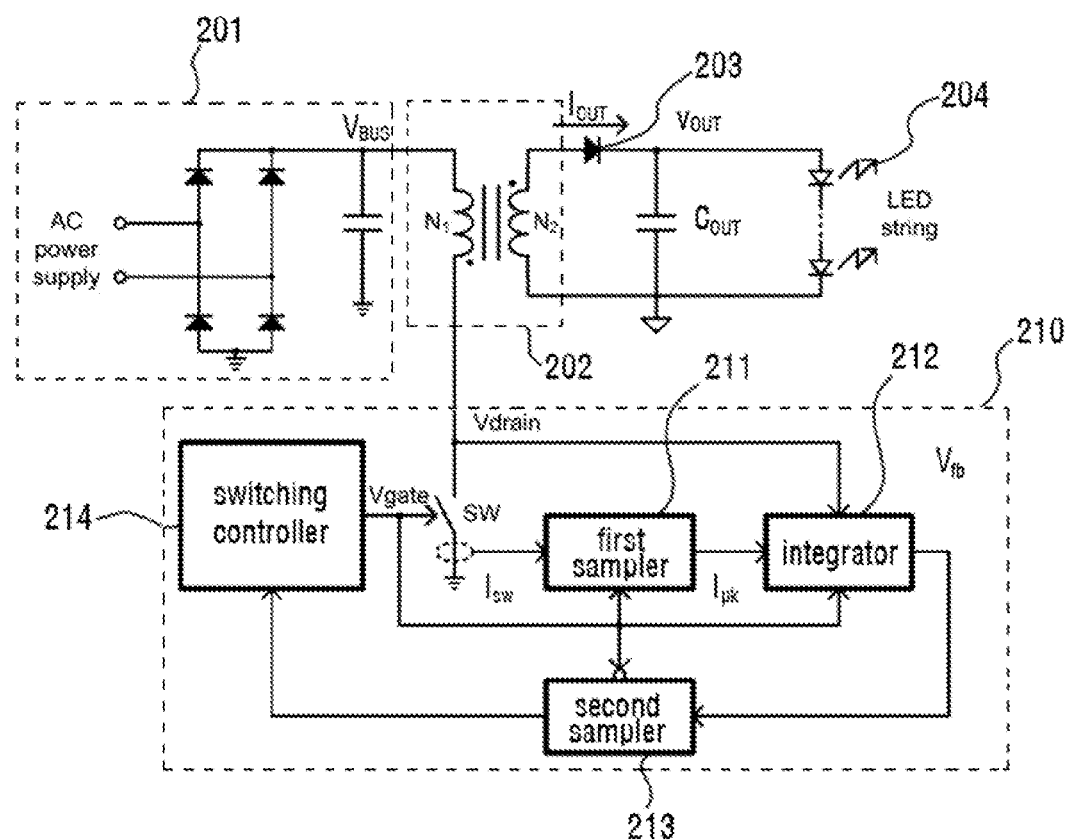
FIG. 2 is a view showing a circuit for a power supply for controlling current in accordance with an embodiment of the present invention.

FIG. 2 is a view showing an embodiment of the power supply for controlling current in accordance with the present invention.

Referring to FIG. 2, the power supply for controlling current in accordance with the present invention includes a rectifier 201, a transformer 202 and a controller 210. The rectifier 201 rectifies an input alternating current (AC) voltage into a direct current (DC) voltage. The transformer 202 receives the DC voltage rectified by the rectifier 201. The controller 210 is connected to one end of a first coil of the transformer 202 and controls a current flowing through the first coil. The controller 210 includes a first sampler 211, an integrator 212, a second sampler 213, a switching controller 214 and a switch (SW). The first sampler 211 receives a current $I_{SW}$ flowing through the first coil of the transformer 202, and then samples and holds the current $I_{SW}$. The integrator 212 receives and integrates a signal proportional to a peak value $I_{PK}$ hold by the first sampler 211. The second sampler 213 receives an output of the integrator 212, i.e., a feedback voltage $V_{fb}$ and samples and holds, and then transfers the held value to the switching controller 214. The switching controller 214 receives the output of the second sampler 213 and controls a switching operation. The switch (SW) controls an electrical connection of the current flowing through the first coil of the transformer 202 in accordance with a control signal of the switching controller 214. The switch (SW) may be implemented with a normal switch which is controlled by a predetermined control signal. For example, the switch (SW) may be implemented with a predetermined transistor including a drain terminal, a source terminal and a gate terminal receiving the control signal. According to the embodiment of the present invention, the second sampler 213 may be omitted for the sake of convenience of a system structure and a circuit configuration. The output of the integrator 212 may be immediately transferred to the switching controller 214.

Hereafter, a principle of operation of the power supply for controlling current shown in FIG. 2 will be described in detail.

First, an AC voltage is generally used as a power source for driving a light emitting device 204. The rectifier 201 comprised of a bridge diode and a capacitor rectifies the AC voltage into the DC voltage.

The DC voltage rectified by the rectifier 201 is applied to the first coil of the transformer 202. While the switch (SW) is in an on-state, energy is stored in the first coil by the output signal of the rectifier 201. Here, the current $I_{SW}$ flowing through the switch increases with the lapse of time. This is computed by the following equation (1).

$$V_{BUS} = L\frac{dI_{SW}}{dt}, I_{SW} = \frac{1}{L}\int V_{BUS}dt \qquad \text{Equation (1)}$$

Referring to equation (1), since the voltage which is applied to the first coil is constant, it can be seen that the $I_{SW}$ uniformly increases in proportion to the time. That is, $I_{SW}$ increases with a constant slope with respect to the time.

The first sampler 211 samples the current $I_{SW}$ flowing through the switch while the switch is in an on-state, and holds the $I_{SW}$ of the moment when the switch becomes in an off-state, and then transfers the value of the $I_{SW}$ to the integrator 212. Since the $I_{SW}$ increases continuously while the switch is in an on-state, the value of the $I_{SW}$ of the moment when the switch becomes in an off-state corresponds to the peak value $I_{PK}$ of the $I_{SW}$. A signal proportional to the peak value $I_{PK}$ is transferred to the integrator 212.

Meanwhile, the light emitting device is driven by current control instead of voltage control. Electric charges transferred by a current $I_{diode}$ flowing through a diode 203 are averaged during one cycle T, and then averaged value corresponds to an average current $ILED_{AVG}$ flowing through the light emitting device 204. The average current flowing through the light emitting device 204 may be computed by the following process.

First, the current $I_{diode}$ flowing through the diode 203 may be represented by the following equation (2).

$$\frac{I_{PK}}{N_2} = \frac{I_{diode_{PK}}}{N_1} \qquad \text{Equation (2)}$$

In equation (2), "$N_1$" represents the number of turns of the first side of the transformer 202. "$N_2$" represents the number of turns of the second side of the transformer 202. A peak value $I_{diode_{PK}}$ of the current flowing through the diode 203 can be obtained by the aforementioned relation.

Accordingly, the average current $ILED_{AVG}$ flowing through the light emitting device 204 may be represented by the following equation (3).

$$ILED_{AVG} = I_{PK} \frac{N_1}{N_2} \frac{T_{off1}}{2T}\qquad\text{Equation (3)}$$

In equation (3), "T" represents an on/off cycle of the switch (SW) and is assumed to be fixed for convenience of description. The average current $ILED_{AVG}$ flowing through the light emitting device 204 is an average value of the current $I_{diode}$ flowing through the diode 203. Therefore, the result shown in equation (3) is produced by integrating the current $I_{diode}$ flowing through the diode 203 with respect to time $T_{off1}$. Here, "$T_{off1}$" represents a time during which all of the energy stored in the first coil of the transformer 202 during the on-state of the switch (SW) is transferred to a second coil after the switch (SW) becomes in an off-state. During the above-mentioned time, a drain voltage $V_{drain}$ of the switch (SW), which is applied to the integrator 202, becomes higher than a bus voltage $V_{BUS}$ applied to the first side of the transformer 202.

The power supply for controlling current of the present invention expects the average current $ILED_{AVG}$ flowing through the light emitting device 204 and drives the light emitting device 204. In other words, the power supply for controlling current copies the average current $ILED_{AVG}$ flowing through the first side in lieu of the second side of the transformer 202, and controls the current for driving the light emitting device 204.

To this end, the integrator 212 according to the embodiment of the present invention copies the average current $ILED_{AVG}$ flowing through the light emitting device 204. The integrator 212 receives a signal proportional to the peak value $I_{PK}$ of the current $I_{SW}$ flowing through the first side of the transformer 202 and integrates the signal for a time of the $T_{off1}$. Accordingly, the feedback voltage $V_{fb}$, that is, the output of the integrator 212 becomes a signal proportional to a value of $I_{PK} \times T_{off1}$. That is to say, the feedback voltage $V_{fb}$ is represented by the following equation (4).

$$V_{fb} = K \times I_{PK} \times T_{off1}\qquad\text{Equation (4)}$$

Here, "K" is represented by the following equation (5).

$$K = \frac{N_1}{2TN_2}\qquad\text{Equation (5)}$$

When the "K" represented by the equation (5) is set to an integration constant of the integrator 212, the feedback voltage $V_{fb}$ copies the average current $ILED_{AVG}$ flowing through the light emitting device 204.

The feedback voltage $V_{fb}$ for controlling the switch is proportional to the peak value $I_{PK}$. Consequently, the feedback voltage $V_{fb}$ copies the average current $ILED_{AVG}$ of the light emitting device 204.

Next, the following is a description of a method for obtaining an integration time $T_{off1}$ during which the integrator 212 integrates the current $I_{diode}$ flowing through the diode 203.

Basically, the integration time $T_{off1}$ of the integrator 212 can be obtained by the change of the drain voltage $V_{drain}$ of the switch (SW).

As a first method, after the rising or falling edge of the drain voltage $V_{drain}$ is detected, a time from the rising point to the falling point of the drain voltage $V_{drain}$ is used as the integration time $T_{off1}$. During the integration time $T_{off1}$, energy is transferred from the first coil to the second coil of the transformer 202.

In other words, a level difference of the drain voltage $V_{drain}$ is detected, and then a time from a point of time when a level of the drain voltage $V_{drain}$ is equal to or higher than a predetermined level to a point of time when the level of the drain voltage $V_{drain}$ is equal to or less than the predetermined level is used as the integration time $T_{off1}$ of the integrator 212.

As a second method, the integration time $T_{off1}$ is directly obtained by detecting the change of a voltage applied to the first coil of the transformer 202.

As a third method, an auxiliary coil is added to the first side of the transformer 202. Then, the integration time $T_{off1}$ of the integrator 212 is also obtained by obtaining the same voltage waveform as the waveform of a voltage applied to the first side of the transformer 202.

In addition to these methods, any method will be used so long as it detects a time from a point of time when the switch (SW) becomes in an off-state to a point of time when all of the energy stored in the first coil is transferred to the second coil of the transformer 202, and uses the detected time as the integration time $T_{off1}$.

The average current $ILED_{AVG}$ flowing through the light emitting device 204 can be indirectly obtained through the feedback voltage $V_{fb}$, i.e., the output signal of the integrator 212 every on/off cycle of the switch (SW). The value of the feedback voltage $V_{fb}$ is inputted to the switching controller 214. The switching controller 214 compares the feedback voltage $V_{fb}$ with a predetermined reference value and is able to control the current $I_{SW}$ flowing through the first side of the transformer 202 in a manner of increasing or decreasing a duty time or an on-time of the switch (SW). As a result, a current flowing through the second side of the transformer 202, that is to say, the current $I_{diode}$ flowing through the diode 203 is controlled and the current flowing through the light emitting device 204 may be hereby controlled.

The process so far described is briefly summarized as follows. The first sampler 211 receives the current $I_{SW}$ flowing through the switch (SW) and outputs the peak value $I_{PK}$ of the current $I_{SW}$. The operation of the first sampler 211 may be controlled by a control signal $V_{gate}$ controlling the on/off of the switch (SW). For example, during the maintenance of the on-state of the switch (SW) by the control signal $V_{gate}$, the first sampler 211 may hold the current $I_{SW}$ of the moment when the switch (SW) becomes in an off-state by the control signal $V_{gate}$ as the peak value $I_{PK}$ while sampling the current $I_{SW}$. The integrator 212 receives a signal proportional to the peak value $I_{PK}$ of the current $I_{SW}$ flowing through the switch (SW), and outputs the feedback voltage $V_{fb}$.

The integrator 212 performs an integration process by using the integration time determined as an interval during which the drain voltage $V_{drain}$ of the switch (SW) is higher than the bus voltage $V_{BUS}$ applied to the first side of the transformer 202, that is to say, a time during which the energy transfer in the transformer 202 is completed after the switch (SW) becomes in an off-state. Therefore, the feedback voltage $V_{fb}$, that is, the output of the integrator 212 may be reset at the moment when the control signal $V_{gate}$ of the switch (SW) becomes in an on-state. The second sampler 213 receives the feedback voltage $V_{fb}$ and transfers the output signal to the switching controller 214. Since the second sampler 213 should transfer the feedback voltage $V_{fb}$ to the switching controller 214 during the maintenance of the off-state of the switch (SW), the second sampler 213 holds the feedback voltage $V_{fb}$ during the maintenance of the on-state of the control signal $V_{gate}$ of the switch (SW), and samples the feedback voltage $V_{fb}$. The output of the integrator 212 may be directly transferred to the switching controller 214 by omitting the second sampler 213, depending on the system structure.

Hereafter, the waveforms of main signals during one on/off cycle of the switch (SW) will be described with reference to FIG. 3.

Figure 3:
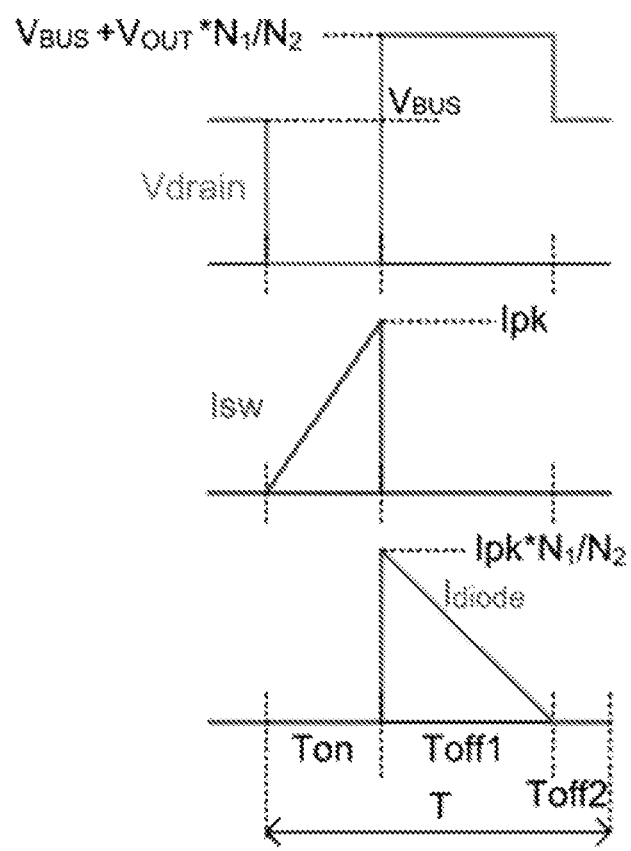
FIG. 3 is a view showing time-based waveforms which represent main signals of the circuit shown in FIG. 2.

Referring to FIG. 3, when the switch (SW) is in the on-state, the drain voltage $V_{drain}$ becomes in an 0V-state and the bus voltage $V_{BUS}$ is applied to the first side of the transformer 202. Subsequently, energy transfer is started from the first side to the second side of the transformer 202 at the moment when the switch (SW) becomes in the off-state. Here, a voltage is applied to both ends of each of the first and the second coils of the transformer 202 in proportion to the number of coilings. Therefore, the value of the drain voltage $V_{drain}$ is increased to a value represented by the following equation (6).

$$V_{drain} = V_{BUS} + V_{OUT} \frac{N_1}{N_2} \qquad \text{Equation (6)}$$

Here, $V_{OUT}$ represents a voltage which is applied to the second coil of the transformer 202. Meanwhile, the current $I_{SW}$ flowing through the switch (SW), as described above, increases with the energy storage during the on-state. The increasing slope of the current $I_{SW}$ flowing through the switch (SW) is proportional to the magnitude of the voltage applied to the first coil of the transformer 202. The current $I_{diode}$ flowing through the diode 203 has a maximum value represented by the following equation (7), depending on the coiling ratio of the coil.

$$I_{diode_{PK}} = I_{PK} \frac{N_1}{N_2} \qquad \text{Equation (7)}$$

The current $I_{diode}$ flowing through the diode 203 decreases with a constant slope from the maximum value $I_{diode_{PK}}$ represented by the equation (7).

Hereafter, a circuit having a power factor correction in accordance with the embodiment of the present invention will be described.

Figure 4:
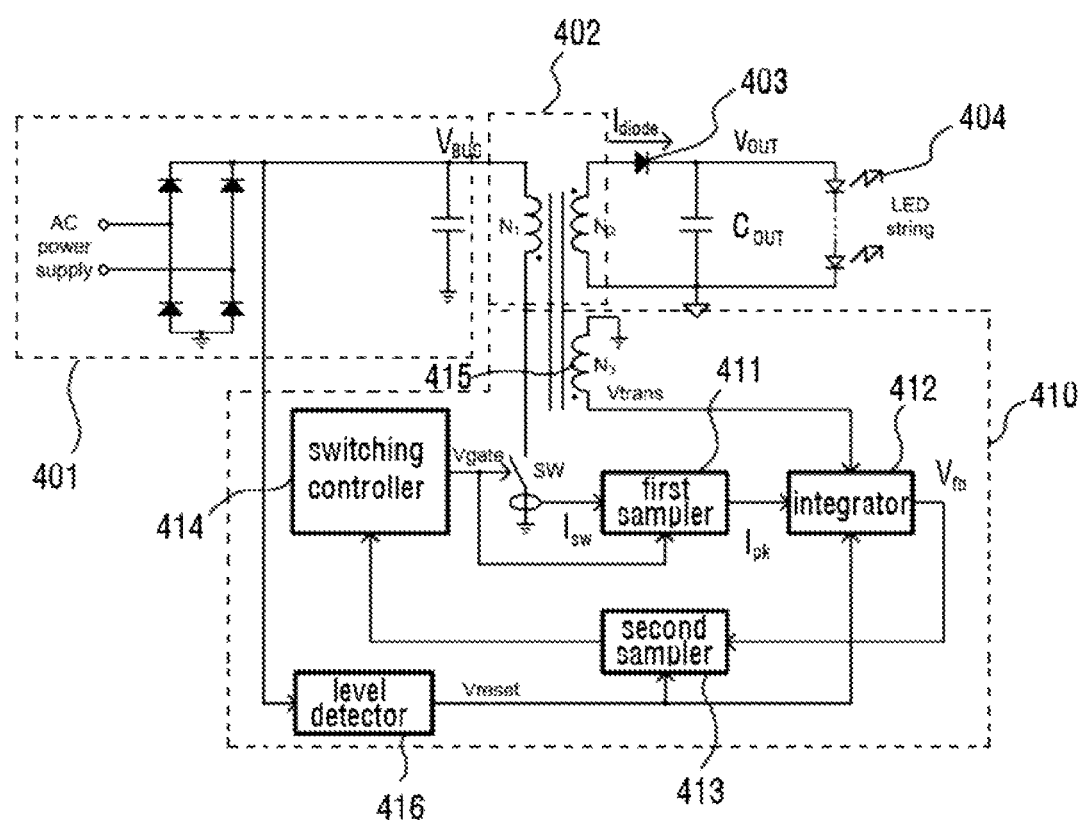
FIG. 4 is a view showing a circuit for the power supply for controlling current, which has a power factor correction in accordance with an embodiment of the present invention.

FIG. 4 is a view showing a structure of a device which drives a light emitting device 404 and has a power factor correction in accordance with an embodiment of the present invention. FIG. 4 shows an example of a power factor correction circuit of the present invention. The power factor correction circuit corrects the power factor in a fixed-on-time manner. Also, the power factor correction circuit of FIG. 4 shows an example of a circuit implemented by using an indirect sensing method.

Referring to FIG. 4, the power supply for controlling current which has the power factor correction added thereto includes a rectifier 401, a transformer 402 and a controller 410. The rectifier 401 rectifies an input AC voltage. The transformer 402 receives the AC voltage rectified by the rectifier 401 and transfers energy from a first side to a second side. The controller 410 is connected to one end of a first coil of the transformer 402 and controls a current flowing through the first coil. The controller 410 includes a first sampler 411, an integrator 412, an auxiliary coil 415, a second sampler 413, a switching controller 414, a level detector 416 and a switch (SW). The first sampler 411 receives a current $I_{SW}$ flowing through the first coil of the transformer 402, and then samples and holds the current $I_{SW}$. The integrator 412 receives and integrates a signal proportional to a peak value $I_{PK}$ hold by the first sampler 411. The auxiliary coil 415 senses a voltage of the second side of the transformer 402, and hereby notifies an integration time to the integrator 412. The second sampler 413 receives an output of the integrator 412, i.e., a feedback voltage $V_{fb}$ and samples and holds, and then transfers the held value to the switching controller 414. The switching controller 414 receives the output of the second sampler 413 and controls on/off operations of the switch (SW). The level detector 416 receives a sinusoid from the rectifier 401 and determines reset timings of the integrator 412 and the second sampler 413 in accordance with a cycle of an input voltage. The switch (SW) becomes on/off states depending on a switching signal $V_{gate}$ and controls an electrical connection of the current flowing through the first coil of the transformer 402 in accordance with a control signal of the switching controller 414.

Hereafter, a method for implementing the power supply for controlling current shown in FIG. 4 will be described in detail.

First, the circuit shown in FIG. 4 is basically similar to the embodiment of the power supply for controlling current shown in FIG. 2. Like the circuit shown in FIG. 2, the circuit shown in FIG. 4 uses the AC voltage as a power source for driving the light emitting device 404. However, unlike the FIG. 2 circuit, the FIG. 4 circuit has no capacitor or a capacitor of a very small capacity, so that it has a very small time constant. Accordingly, when the input voltage passes through the rectifier 401, the input voltage has a rectified sinusoidal waveform like the bus voltage $V_{BUS}$ of FIG. 5.

Besides, the level detector 416 is added for the sake of the power factor correction, and the auxiliary coil 415 is added in order to calculate the integration time $T_{off1}$.

Since a process in which the $I_{SW}$ increases with a slope from the power source for driving the light emitting device 404 and increases is the same as that of FIG. 2, it can be understood with reference to the description of FIG. 2.

Next, the method for calculating the integration time Toff1 of the integrator 412 will be described. First, a voltage having the same waveform as that of the voltage flowing through the first coil is sensed through the auxiliary coil 415. The auxiliary coil 415 may be derived from any one of the first and second sides of the transformer. Here, the voltages applied to the first coil, the second coil and the auxiliary coil 415 have the same waveform. After the voltage having the same waveform as that of the voltage flowing through the first coil is obtained from the auxiliary coil 415, the $T_{off1}$ can be obtained through the voltage variation of the auxiliary coil 415 by the methods described in FIG. 2.

The operations of the first sampler 411 and the integrator 412 are the same as those of FIG. 2. Processes of sampling by the second sampler 413 through the feedback voltage $V_{fb}$ and controlling the switch by the switching controller 414 can be understood with reference to the description of FIG. 2.

The power factor correction will be described as follows. For example, assuming that an AC power supply of the power supply for controlling current has a cycle of 60 Hz (home power supply), the rectifying operation of the rectifier 401 allows the bus voltage $V_{BUS}$, i.e., the voltage of the first side of the transformer 402 to have a rectified sine wave sweeping at a cycle of 120 Hz which is twice as long as 60 Hz from 0 V to a peak voltage of the AC power supply. The control of FIG. 4 is performed by updating the duty time or on-time of the switch (SW) every cycle of 120 Hz. Thus, the integrator 412 updates the feedback voltage $V_{fb}$ every cycle of 120 Hz. Since the switch (SW) is switched at a cycle of several tens of KHz during the update, the integrated values are continuously accumulated whenever the switch (SW) is switched. That is, the feedback voltage $V_{fb}$ of FIG. 4 represents the magnitude of the average current flowing through the light emitting device 404 during the cycle of 120 Hz.

For the sake of the power factor correction, the level detector 416 is added, which senses the bus voltage $V_{BUS}$ and transfers a reset signal to the integrator 412 and the second sampler 413 at a cycle of 120 Hz. The integrator 412 integrates the signal proportional to the peak value $I_{PK}$, i.e., the output of the first sampler 411, and the integrated value, i.e., the feedback voltage $V_{fb}$ is continuously accumulated until the level detector 416 sends the reset signal. The second sampler 413, which has received the accumulated feedback voltage during the cycle of 120 Hz, samples the feedback voltage $V_{fb}$ while the reset signal of the level detector 416 is low, and holds a maximum value of the feedback voltage $V_{fb}$ of the integrator at the time when the reset signal is high, and then transfers the maximum value to the switching controller 414.

While the reset signal is low, the integrator 412 performs the integration process and the second sampler 413 performs the sampling process. While the reset signal is high, the integrator 412 initializes the feedback voltage $V_{fb}$ of the integrator 412 and the second sampler 413 holds the peak value of the output of the integrator 412.

Through these processes, the feedback voltage accumulated during the cycle of 120 Hz is transferred to the switching controller 414. Since the switching controller 414 controls the switch (SW) by means of the feedback voltage accumulated during the cycle of 120 Hz, the average current $ILED_{AVG}$ flowing through the light emitting device 404 has also a cycle of 120 Hz. Consequently, both the voltage and the current which are applied to the light emitting device 404 have a cycle of 120 Hz, so that the power factor correction is improved.

Figure 5:
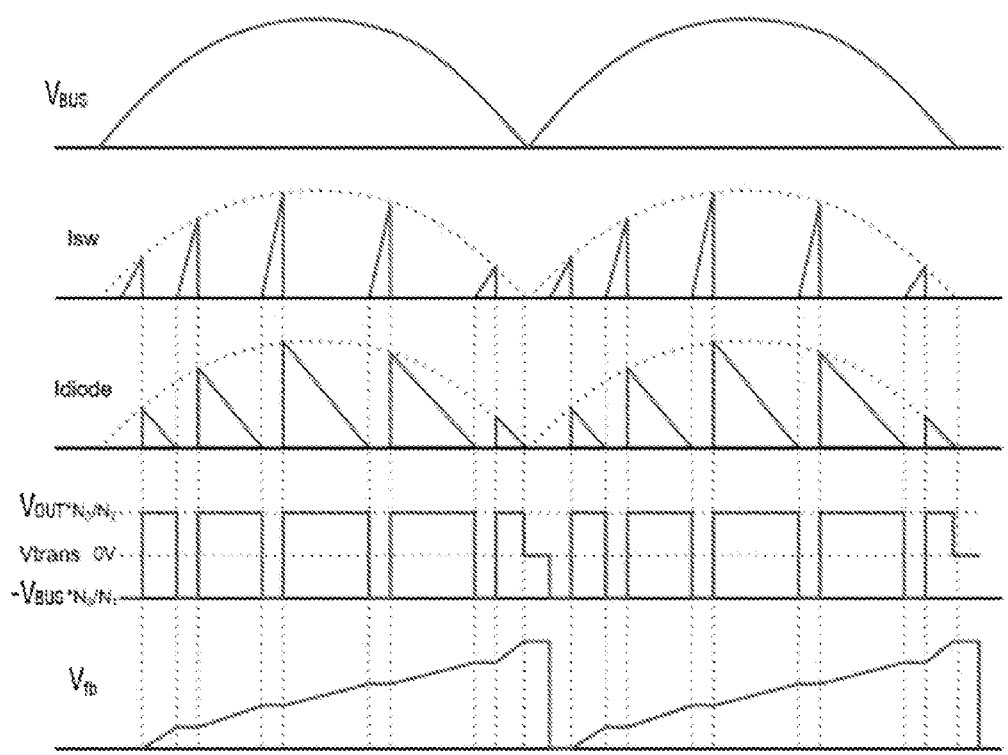
FIG. 5 is a view showing waveforms which approximately represent main signals of the circuit shown in FIG. 4 in accordance with time.

FIG. 5 is a graph showing the changes of the waveforms of main signals in order to describe the above-mentioned operation.

Referring to FIGS. 4 and 5, the bus voltage $V_{BUS}$, i.e., the voltage of the first side of the transformer 402 is obtained by being rectified through the bridge diode of the rectifier 401 and has a sine wave with a cycle of 120 Hz. The current $I_{SW}$ flowing through the switch (SW) has, as described above, a slope changing according to the value of the bus voltage $V_{BUS}$. During the maintenance of the on-state of the switch (SW), the current $I_{SW}$ stores the energy and increases with a constant slope. The increasing slope of the current $I_{SW}$ is proportional to the magnitude of the voltage applied to the first coil of the transformer 402. During the maintenance of the on-state of the switch (SW), when the energy stored in the first side of the transformer 402 is transferred to the second side of the transformer 402 by the off-state of the switch (SW), the current $I_{diode}$ flowing through a diode 403 has a maximum value and decreases at a constant slope from this point of time. The maximum value of the current $I_{diode}$ flowing through the diode 403 may be represented by $I_{diode_{PK}} = I_{PK} \times N_1 \div N_2$.

At the moment when the switch (SW) becomes in an off-state, power supply is started from the first side to the second side of the transformer 402. Here, a voltage is applied to both ends of each of the first and the second coils of the transformer 402 in proportion to the number of coilings. Therefore, the drain voltage $V_{drain}$ of the switch (SW) is increased to $V_{BUS} + V_{OUT} \times N_1 \div N_2$.

A both-end voltage $V_{trans}$ of the auxiliary coil 415 is increased or decreased depending on the on/off of the switch (SW). When the switch (SW) is in an on-state, a relation represented by the following equation is established between the voltage $V_{trans}$ of the auxiliary coil 415 and the bus voltage $V_{BUS}$, i.e., the voltage of the first side of the transformer 402.

$$-\frac{V_{BUS}}{N_1} = \frac{V_{trans}}{N_3} \qquad \text{Equation (8)}$$

Meanwhile, when the switch (SW) is in an off-state, a relation represented by the following equation is established between the voltage $V_{trans}$ of the auxiliary coil 415 and the voltage $V_{OUT}$ of the first side of the transformer 402.

$$\frac{V_{OUT}}{N_2} = \frac{V_{trans}}{N_3} \qquad \text{Equation (9)}$$

The voltage $V_{trans}$ of the auxiliary coil 415 may be calculated by equations (8) and (9). The voltage $V_{trans}$ of the auxiliary coil is increased or decreased.

As described above, the feedback voltage $V_{fb}$, i.e., the output voltage of the integrator 412 is reset in accordance with the cycle of the waveform of the bus voltage $V_{BUS}$, i.e., the voltage of the first side of the transformer 402. Therefore, the feedback voltage Vfb has, as shown in FIG. 5, a shape in which a value obtained by integrating the current $I_{diode}$ flowing through the diode 403 is continuously accumulated and is reset in accordance with the cycle of the waveform of the bus voltage $V_{BUS}$.

Referring back to FIG. 5, while the energy is transferred to the first side of the transformer 402 to the second side of the transformer 402, the feedback voltage $V_{fb}$, i.e., the output voltage of the integrator 412 is continuously increased. Here, the feedback voltage $V_{fb}$ is maintained constant during the on-state of the switch (SW), and is increased during the energy transfer by the off-state of the switch (SW). The increasing feedback voltage $V_{fb}$ is initialized by the reset signal of the level detector 416 in accordance with the aforementioned principle. In other words, the $V_{BUS}$ and the $V_{fb}$ have a cycle of 120 Hz, and the $V_{fb}$ copies the $ILED_{AVG}$. Consequently, the $V_{fb}$, and the $ILED_{AVG}$ have the same cycle of 120 Hz, so that the power factor correction is improved.

Figure 6:
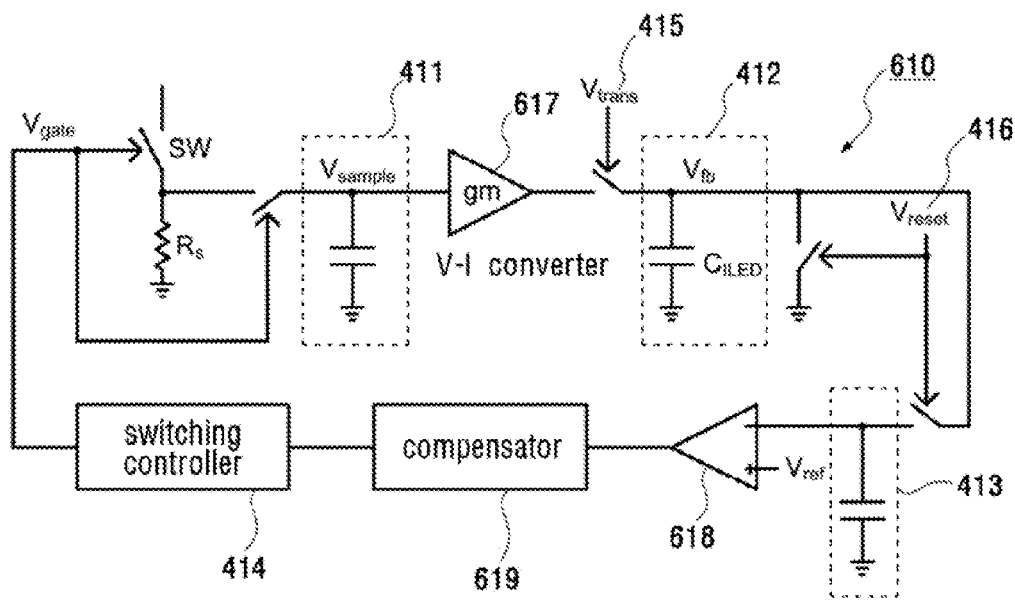
FIG. 6 is a view showing a circuit for a controller of the circuit shown in FIG. 4.

FIG. 6 is a view showing a detailed embodiment of the controller 610 for FIG. 4.

A method for implementing the power supply for controlling current by a controller 610 shown in FIG. 6 will be described in detail.

As shown in FIG. 6, a switch obtains a switch voltage $V_{sw}$ corresponding to a switch current $I_{sw}$ by using a resistor $R_s$. The first sampler 411 samples and holds the switch voltage $V_{sw}$. The value of the switch voltage $V_{sw}$ held by the first sampler 411 is converted into a current value by a voltage to current converter (hereafter, referred to as a V-I converter) 617. The current value converted by the V-I converter 617 is integrated by the integrator 412, and then the feedback voltage $V_{fb}$ is obtained. The reset signal for the integrator 412 is inputted from the level detector 416. The second sampler 413 samples and holds the feedback voltage $V_{fb}$. The reset signal for the second sampler 413 is also applied from the level detector 416. The sampled and held feedback voltage $V_{fb}$ is compared with a reference voltage $V_{ref}$ by a comparator 618. The reference voltage $V_{ref}$ may be a predetermined set voltage or a ground. A compensator 619 is used so as to compensate a phase for the result by the comparator 618. A result through the compensator 619 is applied to the switching controller 414, and the switch is controlled.

Referring to FIG. 6, a current applied to the integrator 412 is represented by equation (10).

$$gm \times R_s \times I_{pk} \qquad \text{Equation (10)}$$

By using the current value by equation (10), the feedback voltage $V_{fb}$ from the integrator 412 is obtained by equation (11).

$$V = \frac{1}{C} \times \int idt, \quad V_{fb} = \frac{gm \times R_s \times I_{pk}}{C_{ILED}} \times T_{off1} \qquad \text{equation (11)}$$

Accordingly, the following third embodiment of the present invention provides the power supply for controlling current in order to reduce costs.

Figure 7:
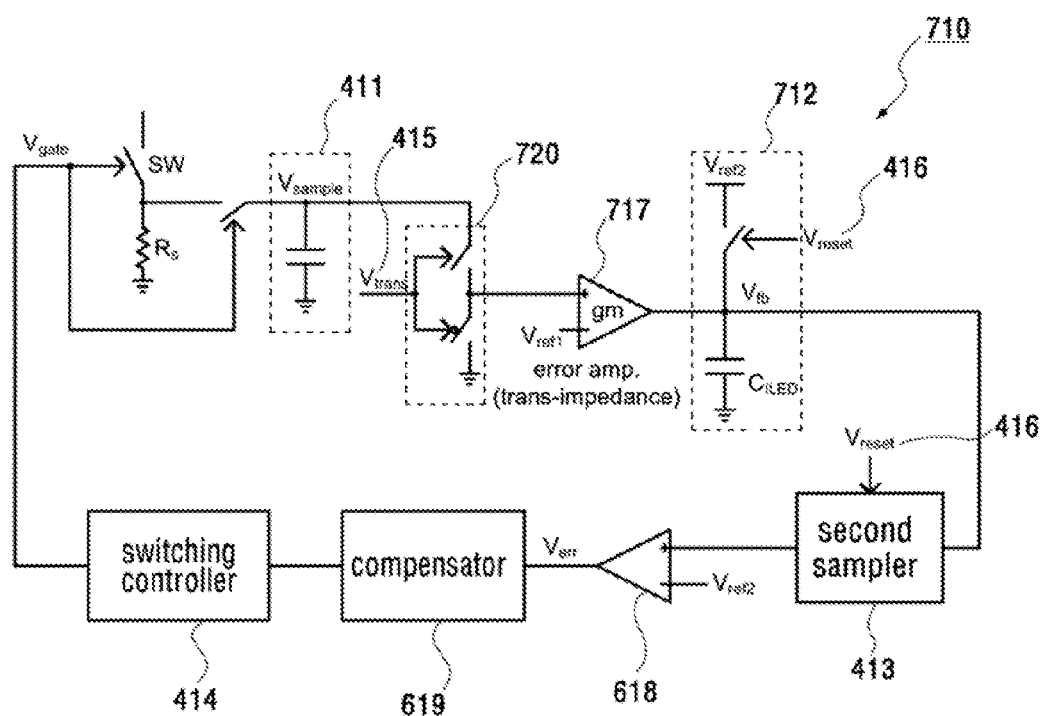
FIG. 7 is a view showing a circuit for a controller of the power supply for controlling current in accordance with an embodiment of the present invention for the purpose of reducing production costs.

FIG. 7 shows the power supply for controlling current in accordance with the embodiment of the present invention.

Referring to FIG. 7, the power supply for controlling current includes the first sampler 411, a voltage to current converter (hereafter, referred to as a V-I converter) 717, an integrator input switching unit 720, an integrator 712, the second sampler 413, the comparator 618, the compensator 619 and the switching controller 414. The first sampler 411 samples and holds a maximum voltage flowing through the switch. The V-I converter 717 converts the difference between the sampled peak voltage $V_{pk}$ and a first reference voltage $V_{ref1}$ into a current. The integrator input switching unit 720 switches the peak voltage $V_{pk}$ and a ground signal, between the first sampler 411 and the V-I converter 717, and applies them to the V-I converter 717. The integrator 712 receives and integrates the current value converted by the V-I converter 717. The second sampler 413 receives, samples and holds the integrated feedback voltage $V_{fb}$. The comparator 618 receives the feedback voltage $V_{fb}$ sampled and held by the second sampler 413, and outputs a difference between the feedback voltage $V_{fb}$ and a second reference voltage $V_{ref2}$. The compensator 619 compensates and changes the output voltage $V_{err}$ from the comparator 618 into the control signal of the switching controller 414. The switching controller 414 receives the output signal of the compensator 619 and controls the switch.

Hereafter, the power supply of FIG. 7 for controlling current will be described in detail.

Figure 9:
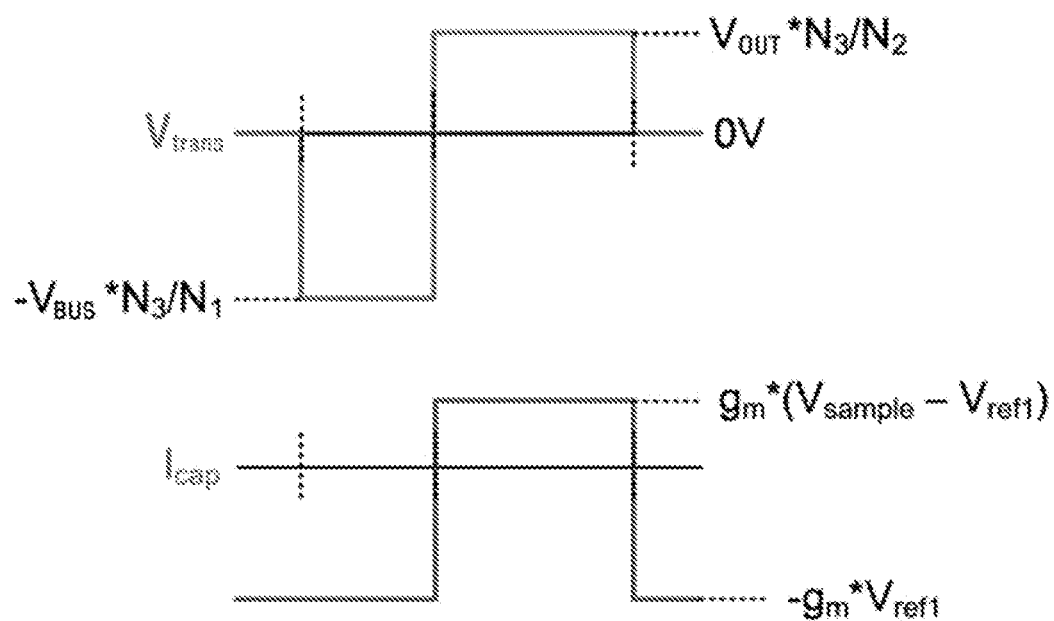
FIG. 9 shows variations of $V_{trans}$ and $I_{cap}$ of FIGS. 7 and 8 in accordance with time.
Figure 10:
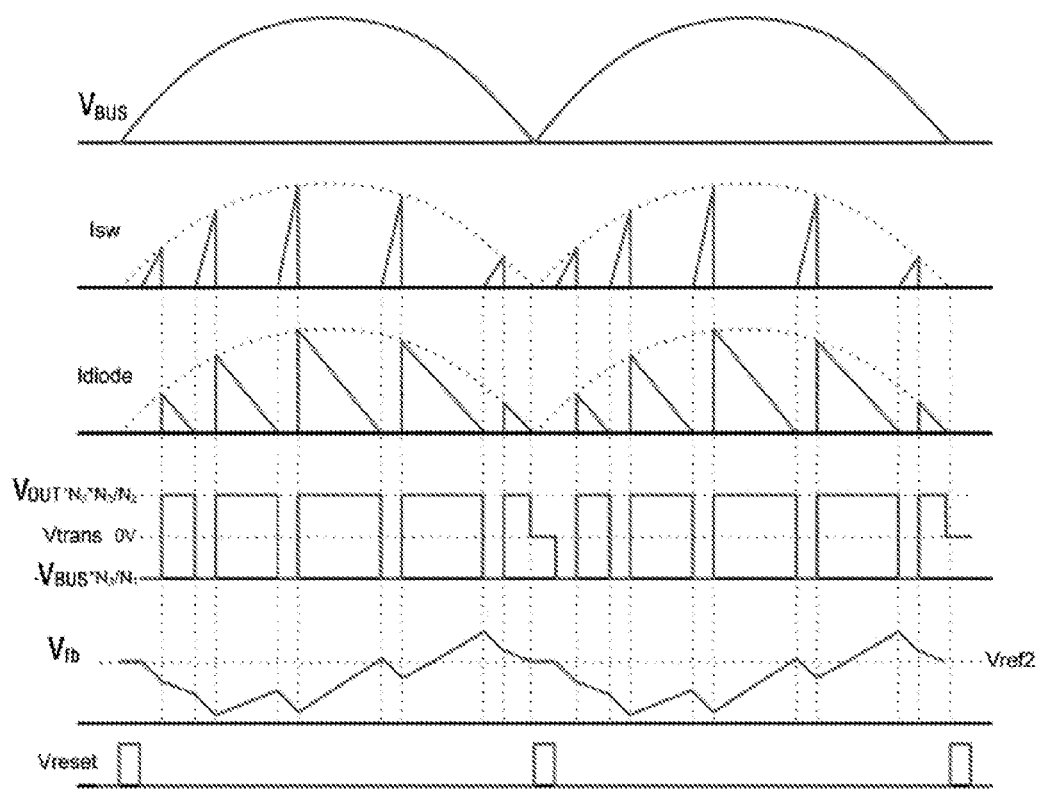
FIG. 10 is a view showing waveforms which approximately represent main signals of the circuits shown in FIGS. 7 and 8 in accordance with time.

As shown in FIG. 7, the switch (SW) obtains the $V_{sw}$ corresponding to the $I_{sw}$ by using the resistor $R_s$. The first sampler 411 samples and holds the $V_{sw}$ and obtains the $V_{pk}$. The integrator input switching unit 720 controls a positive input to the V-I converter 717 by using the voltage $V_{trans}$ of the auxiliary coil 415. That is to say, when the voltage $V_{trans}$ of the auxiliary coil 415 is positive, the result $V_{pk}$ by the first sampler 411 is transferred to the V-I converter 717. When the voltage $V_{trans}$ of the auxiliary coil 415 is negative, the ground signal is transferred to the V-I converter 717. FIG. 9 shows the variation of the voltage $V_{trans}$ of the auxiliary coil 415. The value of the feedback voltage $V_{fb}$ obtained through the integration of the current in accordance with the variation of the voltage $V_{trans}$, is represented by equation (12).

$$V_{fb} = V_{ref2} + \Sigma[gm \cdot (R_s \cdot I_{pk} - V_{ref1}) \cdot T_{off1} - gm \cdot V_{ref1} \cdot (T_{on} + T_{off2})]/C_{ILED} \qquad \text{Equation (12)}$$

According to equation (12), a current which is applied to a capacitor $C_{ILED}$ of the integrator is shown in FIG. 9. The second reference voltage $V_{ref2}$ is a reference value of the feedback voltage $V_{fb}$. That is, when the integrator 712 is reset, the feedback voltage $V_{fb}$ is reset to the second reference voltage $V_{ref2}$. The feedback voltage $V_{fb}$ is applied to the second sampler 413, and is sampled and held.

The sampled and held feedback voltage $V_{fb}$ is compared with the second reference voltage $V_{ref2}$ by the comparator 618. Then, a difference between the feedback voltage $V_{fb}$ and the second reference voltage $V_{ref2}$, i.e., the comparator output voltage $V_{err}$ is outputted. The comparator output voltage $V_{err}$ is represented by equation (13).

$$V_{err} = \left[\sum R_s \cdot I_{pk} \cdot T_{off1} - V_{ref1} \cdot T\right] \times \frac{gm}{C_{ILED}} \qquad \text{Equation (13)}$$

The comparator output voltage $V_{err}$ is compensated by the compensator 619 and is transferred to the switching controller 414. The switching controller 414 receives the compensated comparator output voltage $V_{err}$ and controls the switch.

During such a series of the switching control process, the comparator output voltage $V_{err}$ is represented by equation (13). Consequently, when the comparator output voltage $V_{err}$ converges to 0, a relation of equation (14) is established.

$$\sum R_s \cdot I_{pk} \cdot T_{off1} - V_{ref1} \cdot T = 0, \qquad \text{Equation (14)}$$

$$\sum I_{pk} \cdot T_{off1} = \frac{V_{ref1} \cdot T}{R_s}$$

Referring to equation (14), the average current $ILED_{AVG}$ may be represented by equation (15).

$$ILED_{AVG} = \frac{N_1}{N_2} \frac{\sum I_{PK} \cdot T_{off1}}{2T} = \frac{1}{2} \cdot \frac{N_1}{N_2} \cdot \frac{V_{ref1}}{R_s} \qquad \text{Equation (15)}$$

Referring to equation (15), the average current $ILED_{AVG}$ flowing through the light emitting device 204 is determined by the first reference voltage $V_{ref1}$ and $R_s$. Accordingly, it is possible to precisely control the current by enhancing the accuracy of the resistance value instead of the capacitor or transconductance. The accuracy of the first reference voltage $V_{ref1}$ should be enhanced, however, this can be done by calibrating a band-gap voltage. Therefore, it is possible to reduce the production cost of the power supply for controlling current.

Figure 8:
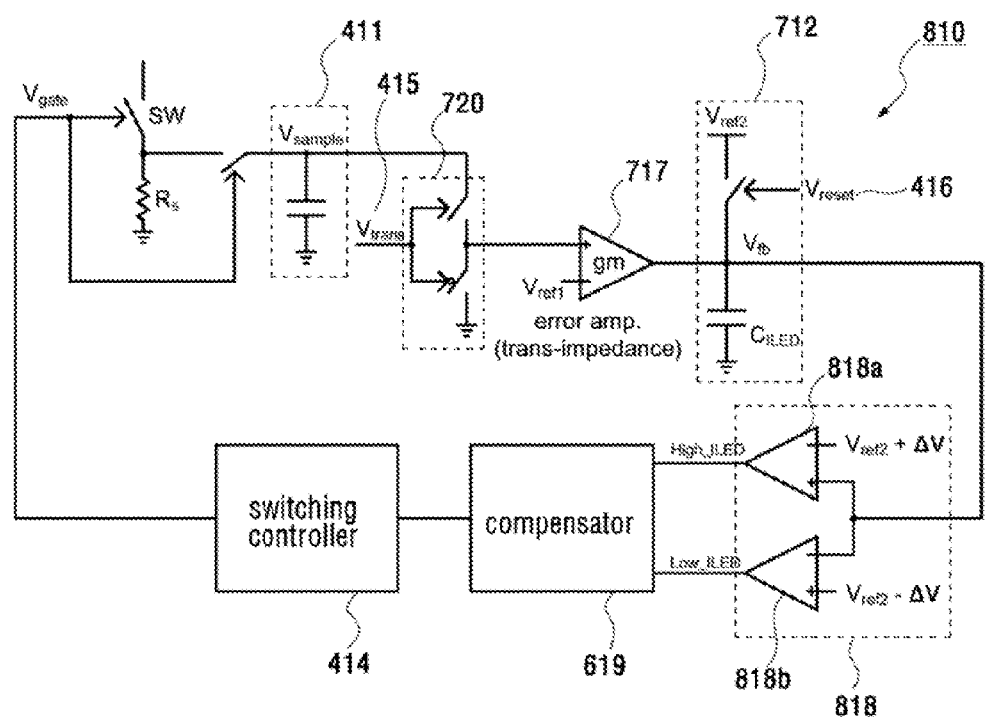
FIG. 8 is a view showing a circuit for a controller of another power supply for controlling current in accordance with an embodiment of the present invention for the purpose of reducing production costs.

FIG. 8 shows a fourth embodiment of the power supply for controlling current in accordance with the present invention.

The overall flow of the power supply for controlling current in FIG. 8 is the same as that of the foregoing description.

The power supply for controlling current will be described in detail with reference to FIG. 8.

As shown in FIG. 8, according to the fourth embodiment of the present invention, the fourth embodiment may include a comparing unit 818 which receives the feedback voltage $V_{fb}$, i.e., the result of the integrator 712 and outputs a signal for controlling the switch (SW). The comparing unit 818 may includes a first comparator 818a and a second comparator 818b. The first comparator 818a outputs High_ILED. The second comparator 818b outputs Low_ILED. The feedback voltage $V_{fb}$, i.e., the result of the integrator 712 which is transferred to the compensator 619 is applied to the non-inverting input terminal of the first comparator 818a, which receives a third reference voltage $V_{ref2}+\Delta V$ through an inverting input terminal, and the feedback voltage $V_{fb}$ is also applied to the inverting input terminal of the second comparator 818b, which receives a fourth reference voltage $V_{ref2}-\Delta V$ through a non-inverting input terminal.

Therefore, when the feedback voltage $V_{fb}$ is higher than the third reference voltage $V_{rer2}+\Delta V$, the first comparator 818a outputs the High_ILED and the second comparator 818b outputs the Low_ILED. The compensator 619 compensates and changes the High_ILED, i.e., the output of the first comparator 818a into a signal for controlling the switching controller 414. The switching controller 414 reduces the on-time of the switch in response to the signal from the compensator 619.

To the contrary, when the feedback voltage $V_{fb}$ is lower than the fourth reference voltage $V_{ref2}-\Delta V$, the first comparator 818a outputs the Low_ILED and the second comparator 818b outputs the High_ILED. The compensator 619 receives the Low_ILED, i.e., the output of the second comparator 818b and compensates and changes the Low_ILED into a signal for controlling the switching controller 414. The switching controller 414 lengthens the on-time of the switch in response to the signal from the compensator 619.

When the feedback voltage $V_{fb}$ is lower than the third reference voltage $V_{rer2}+\Delta V$ and is higher than the fourth reference voltage $V_{ref2}-\Delta V$, both of the first comparator 818a and the second comparator 818b output the Low_ILED, so that the switching controller 414 maintains its current state. By this process, the feedback voltage $V_{fb}$ is controlled between the third reference voltage $V_{ref2}+\Delta V$ and the fourth reference voltage $V_{ref2}-\Delta V$.

Accordingly, when the value of $\Delta V$ converges to 0, the same result as that of FIG. 7 is obtained by equations (14) and (15). The accuracy of the current control is determined by $\Delta V$. Though the resolution of the feedback voltage $V_{fb}$ is substantially affected by the value of the $C_{ILED}$, the absolute value of the $C_{ILED}$ does not always need to be accurate.

In the embodiment of the present invention, although the comparing unit 818 includes two comparators, two or more comparators may be included without being limited to this.

Hereafter, a relation between the accuracy of the current control and the value of the $C_{ILED}$ will be described.

$$V_{ref2}-\Delta V \le V_{fb} \le V_{ref2}+\Delta V \quad \text{Equation (16)}$$

The following equation (17) is obtained by subtracting the second reference voltage $V_{ref2}$ from each side of equation (16) and by substituting the value of equation (12) for the feedback voltage $V_{fb}$.

$$-\Delta V \le [\Sigma gm \cdot R_s \cdot I_{pk} \cdot T_{off1} - gm \cdot V_{ref1} \cdot T]/C_{ILED} \le \Delta V \quad \text{Equation (17)}$$

The following equation (18) is obtained by dividing each side of equation (17) by $gm \cdot V_{ref1} \cdot T$ and by multiplying each side by the $C_{ILED}$.

$$\frac{-\Delta V \cdot C_{ILED}}{gm \cdot V_{ref1} \cdot T} \le \frac{R_s}{V_{ref1} \cdot T} \cdot \left(\sum I_{pk} \cdot T_{off1}\right) - 1 \le \frac{\Delta V \cdot C_{ILED}}{gm \cdot V_{ref1} \cdot T} \quad \text{Equation (18)}$$

For example, if the power supply for controlling current in accordance with the present invention requires accuracy of ±5%, the following condition is satisfied.

$$-0.05 \le \frac{R_s}{V_{ref1} \cdot T} \cdot \left(\sum I_{pk} \cdot T_{off1}\right) - 1 \le \quad \text{Equation (19)}$$

$$0.052 \cdot \frac{\Delta V \cdot C_{ILED}}{gm \cdot V_{ref1} \cdot T} \le 0.05$$

Accordingly, when it is assumed that $\Delta V$=50 mV, gm=10 uS, T=8.3 msec and $V_{ref1}$=0.2V, it is enough as long as $C_{ILED} \le 16.6$ nF. That is, the production cost of the power supply for controlling current can be reduced by relatively reducing the accuracy required for the capacitor.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. That is to say, the components described in detail in the embodiments of the present invention may be modified. Further, differences due to the modification and application should be construed as being included in the scope and spirit of the present invention, which is described in the accompanying claims.

What is claimed is:

1. A power supply for controlling current, the power supply comprising:
    a transformer which converts a first current into a second current and supplies the second current to a load line unit;
    a sampler which samples a peak value of the first current;
    an integrator which uses a signal proportional to the peak value of the first current and outputs a signal proportional to an average value of a current flowing through the load line unit; and
    a switching controller which controls a time during which the first current flows by means of the output signal of the integrator,
    wherein, with respect to a time during which energy stored in a first side of the transformer is completely transferred to a second side of the transformer, the integrator integrates the signal proportional to the peak value of the first current, and
    wherein the integrator calculates the energy transfer time by detecting a voltage variation of a connection portion between a first coil of the transformer and a switch controlling the on/off of the first current, and integrates the signal proportional to the peak value of the first current for the energy transfer time.

2. The power supply for controlling current of claim 1, wherein the integrator integrates the signal proportional to the peak value of the first current from a time when the voltage of the connection portion between the first coil and the switch becomes higher than the voltage applied to, the first side to a time when both the voltages become equal to each other.

3. The power supply for controlling current of claim 1, wherein the load line unit comprises at least one light emitting device.

4. A power supply for controlling current, the power supply comprising:
    a transformer which converts a first current into a second current and supplies the second current to a load line unit;
    a sampler which samples a peak value of the first current;
    an integrator which uses a signal proportional to the peak value of the first current and outputs a signal proportional to an average value of a current flowing through the load line unit;
    a switching controller which controls a time during which the first current flows by means of the output signal of the integrator; and
    a switch switching the first current on/off, wherein the sampler samples the first current during the on-state of the switch and holds the first current of the moment when the switch becomes in an off-state as the peak value of the first current, and wherein the switching controller controls a turn-on time of the switch through the output signal of the integrator.

5. A power supply for controlling current, the power supply comprising:
a transformer which converts a first current into a second current and supplies the second current to a load line unit;
a sampler which samples a peak value of the first current;
an integrator which uses a signal proportional to the peak value of the first current and outputs a signal proportional to an average value of a current flowing through the load line unit; and
a switching controller which controls a time during which the first current flows by means of the output signal of the integrator,
wherein, with respect to a time during which energy stored in a first side of the transformer is completely transferred to a second side of the transformer, the integrator integrates a difference between the signal proportional to the peak value of the first current and a first predetermined reference value Vref1, and integrates a negative value of the first predetermined reference value Vref1 while the energy is not transferred by the transformer.

6. The power supply for controlling current of claim 5, further comprising a level detector transferring a reset signal to the integrator.

7. The power supply for controlling current of claim 5, wherein the integrator has a second predetermined reference value $V_{ref2}$ as a reference value, and further comprising:
a first comparator which compares a value received from the integrator with a third predetermined reference value $V_{ref2}+\Delta V$;
a second comparator which compares a value received from the integrator with a fourth predetermined reference value $V_{ref2}-\Delta V$; and
a compensator which compensates and changes the values transferred from the two comparators into a signal corresponding to an on-time of the switch, and transfers the compensated values to the switching controller.

8. The power supply for controlling current of claim 5, further comprising a second sampler which samples and holds the output signal of the integrator, and transfers the signal to the switching controller.

9. The power supply for controlling current of claim 8, wherein, with respect to a time during which energy stored in a first side of the transformer is completely transferred to a second side of the transformer, the integrator integrates a difference between the signal proportional to the peak value of the first current and a first predetermined reference value $V_{ref1}$, and integrates a negative value of the first predetermined reference value $V_{ref1}$ while the energy is not transferred by the transformer.

10. The power supply for controlling current of claim 9, wherein the integrator has a second predetermined reference value $V_{ref2}$ as a reference value, and further comprising:
a comparator which compares a value received from the second sampler with the second reference value $V_{ref2}$; and
a compensator which compensates and changes the value transferred from the comparator into a signal corresponding to an on-time of the switch, and transfers the compensated value to the switching controller.

11. A power supply for controlling current, the power supply comprising:
a transformer which converts a first current into a second current and supplies the second current to a load line unit;
a first sampler which samples a peak value of the first current;
an integrator which uses a signal proportional to the peak value of the first current and outputs a signal proportional to an average value of a current flowing through the load line unit;
a second sampler which samples the output signal of the integrator;
a level detector which transfers a reset signal to the integrator and the second sampler; and
a switching controller which controls a time during which the first current flows by means of the output signal of the second sampler,
wherein the level detector updates an integration cycle of the integrator and a sampling cycle of the second sampler in accordance with a cycle of an input voltage.

12. The power supply for controlling current of claim 11, wherein the level detector updates a switch-on time every half cycle of an input power.

13. The power supply for controlling current of claim 11, wherein the load line unit comprises at least one light emitting device.

14. A power supply for controlling current, the power supply comprising:
a transformer which converts a first current into a second current and supplies the second current to a load line unit;
a first sampler which samples a peak value of the first current;
an integrator which uses a signal proportional to the peak value of the first current and outputs a signal proportional to an average value of a current flowing through the load line unit;
a second sampler which samples the output signal of the integrator;
a level detector which transfers a reset signal to the integrator and the second sampler; and
a switching controller which controls a time during which the first current flows by means of the output signal of the second sampler,
wherein, with respect to a time during which energy stored in a first side of the transformer is completely transferred to a second side of the transformer, the integrator integrates the signal proportional to the peak value of the first current, and
wherein the integrator calculates the energy transfer time by detecting a voltage variation of a connection portion between a first coil of the transformer and a switch controlling the on/off of the first current, and integrates the signal proportional to the peak value of the first current for the energy transfer time.

15. The power supply for controlling current of claim 14, wherein the integrator integrates the signal proportional to the peak value of the first current, from a time when the voltage of the connection portion between the first coil and the switch becomes higher than the voltage applied to the first side to a time when both the voltages become equal to each other.

16. A power supply for controlling current, the power supply comprising:
a transformer which converts a first current into a second current and supplies the second current to a load line unit;
a first sampler which samples a peak value of the first current;

an integrator which uses a signal proportional to the peak value of the first current and outputs a signal proportional to an average value of a current flowing through the load line unit;

a second sampler which samples the output signal of the integrator;

a level detector which transfers a reset signal to the integrator and the second sampler;

a switching controller which controls a time during which the first current flows by means of the output signal of the second sampler and a switch switching the first current on/off, wherein the first sampler samples the first current during the on-state of the switch and holds the first current of the moment when the switch becomes in an off-state as the peak value of the first current, wherein the level detector transfers the reset signal to the integrator in accordance with a cycle of an input voltage, wherein the second sampler samples the output signal of the integrator while the reset signal of the level detector is in a low-state, and holds the output signal of the integrator while the reset signal of the level detector is in a high-state, and then transfers the output signal of the integrator to the switching controller, and wherein the switching controller controls a turn-on time of the switch through the output signal of the integrator from the second sampler.

17. A power supply for controlling current, the power supply comprising:

a transformer which converts a first current into a second current and supplies the second current to a load line unit;

a first sampler which samples a peak value of the first current;

an integrator which uses a signal proportional to the peak value of the first current and outputs a signal proportional to an average value of a current flowing through the load line unit;

a second sampler which samples the output signal of the integrator;

a level detector which transfers a reset signal to the integrator and the second sampler; and a switching controller which controls a time during which the first current flows by means of the output signal of the second sampler, wherein, with respect to a time during which energy stored in a first side of the transformer is completely transferred to a second side of the transformer, the integrator integrates a difference between the signal proportional to the peak value of the first current and a first predetermined reference value Vref1, and integrates a negative value of the first predetermined reference value Vref1 while the energy is not transferred by the transformer.

18. The power supply for controlling current of claim 17, wherein the integrator has a second predetermined reference value $V_{ref2}$ as a reference value, and further comprising:

a comparator which compares a value received from the second sampler with the second reference value $V_{ref2}$; and a compensator which compensates and changes the value transferred from the comparator into a signal corresponding to an on-time of the switch, and transfers the compensated value to the switching controller.

19. The power supply for controlling current of claim 17, wherein the integrator has a second predetermined reference value $V_{ref2}$ as a reference value, and further comprising:

a first comparator which compares a value received from the second sampler with a third predetermined reference value $V_{ref2}+\Delta V$;

a second comparator which compares a value received from the second sampler with a fourth predetermined reference value $V_{ref2}-\Delta V$; and a compensator which compensates and changes the values transferred from the two comparators into a signal corresponding to an on-time of the switch, and transfers the compensated values to the switching controller.

* * * * *